United States Patent [19]

Sakamoto et al.

[11] Patent Number: 5,459,514
[45] Date of Patent: Oct. 17, 1995

[54] VIDEO-SIGNAL TRANSMITTING AND RECEIVING APPARATUS AND METHOD FOR TRANSMITTING AND RECEIVING HIGH-RESOLUTION AND LOW-RESOLUTION TELEVISION SIGNALS

[75] Inventors: Noriya Sakamoto; Tatsuya Ishikawa, both of Yokohama, Japan

[73] Assignee: Kabushiki Kaisha Toshiba, Kawasaki, Japan

[21] Appl. No.: 207,143

[22] Filed: Mar. 8, 1994

[30] Foreign Application Priority Data

Mar. 30, 1993 [JP] Japan .................... 5-071662

[51] Int. Cl.⁶ ............... H04N 5/44; H04N 5/46; H04N 7/12
[52] U.S. Cl. ............. 348/398; 348/387; 348/437; 348/438
[58] Field of Search ................. 348/385, 387, 348/397, 398, 723, 724, 726, 705, 432, 437, 438; H04N 5/14, 5/46, 5/44, 5/38, 5/40, 7/07, 7/12

[56] References Cited

U.S. PATENT DOCUMENTS

| | | | |
|---|---|---|---|
| 4,215,369 | 7/1980 | Iijima | 348/387 |
| 4,593,318 | 6/1986 | Eng et al. | 348/385 |
| 4,660,096 | 4/1987 | Arlan et al. | 348/385 |
| 4,975,771 | 12/1990 | Kassatly | 348/385 |
| 5,216,719 | 6/1993 | Oh | 348/398 |
| 5,337,085 | 8/1994 | Lee et al. | 348/398 |

FOREIGN PATENT DOCUMENTS

| | | |
|---|---|---|
| 0396368 | 11/1990 | European Pat. Off. . |
| 0460997 | 12/1991 | European Pat. Off. . |
| 0465110 | 1/1992 | European Pat. Off. . |
| 0520546 | 12/1992 | European Pat. Off. . |
| 0527632 | 2/1993 | European Pat. Off. . |
| 0542196 | 5/1993 | European Pat. Off. . |
| 0578201 | 1/1994 | European Pat. Off. . |
| 1157181 | 6/1989 | Japan .................. H04N 5/46 |

*Primary Examiner*—James J. Groody
*Assistant Examiner*—Glenton B. Burgess
*Attorney, Agent, or Firm*—Cushman Darby & Cushman

[57] ABSTRACT

A system capable of performing compatible transmitting and receiving processes, regardless of whether a TV signal on the transmission side is a high-resolution signal or a low-resolution signal or whether the reception side includes a high-resolution display unit or a low-resolution display unit. On the transmission side, a frequency division circuit divides a high-resolution TV signal into signals in a plurality of frequency bands. The signals in each frequency band are converted into signals of a horizontal and vertical low band (a low-resolution TV signal band). The converted signals are coded by coding units, which transmit the coded signals. On the reception side, the coded signals multiplexed on the transmission side are separated and decoded at decoding units. A frequency synthesizing circuit restores the frequency bands of the decoded signals to the original bands. Then, the resulting signals are displayed with a high resolution. A low-resolution signal is coded and then transmitted. The coded signal is decoded on the reception side. The decoded signal is interpolated at an interpolation circuit. The interpolated signal is then displayed on a high-resolution display unit.

13 Claims, 8 Drawing Sheets

DECODING STAGE

FIG. 7A
FIG. 7B
UP-SAMPLING
FIG. 7C BEFORE UP-SAMPLING
FIG. 7D AFTER UP-SAMPLING

FIG. 8A  FIG. 8B  FIG. 8C  FIG. 8D

VIDEO-SIGNAL TRANSMITTING AND RECEIVING APPARATUS AND METHOD FOR TRANSMITTING AND RECEIVING HIGH-RESOLUTION AND LOW-RESOLUTION TELEVISION SIGNALS

BACKGROUND OF THE INVENTION

1. Field of the Invention

This invention relates to a video-signal transmitting and a video-signal receiving apparatus for use in a video-signal transmitting and receiving system which subjects a video signal, such as a television signal, to digital high-efficient coding for transmission and reception.

2. Description of the Related Art

A system which subjects a high-resolution television signal (hereinafter, referred to as a high-resolution TV signal) to high-efficient coding, transfers the coded signal, and causes a receiver to decode the transmitted signal are known. The high-resolution TV signal is supplied to a high-efficient coding circuit of an HDTV (high-definition television) encoder. The HDTV encoder is composed of a high-efficient coding circuit and an output buffer. The high-efficient coding circuit subjects the signal supplied from the input terminal to high-efficient coding and supplies the coded signal to the buffer. The output buffer is a smoothing buffer for outputting a transmitted signal at a constant transmission rate to a transmission line. The output buffer, when the amount of signals stored exceeds a specified value, feeds back a control signal to the high-efficient coding circuit in order to reduce the amount of signals supplied from the encoding circuit. The constant-rate signal supplied from the HDTV is supplied to an input buffer of an HDTV decoder via the transmission line. The HDTV decoder is composed of an input buffer and a decoding circuit. The input buffer stores the signals supplied from the transmission line and supplies a constant-rate signal to the decoding circuit. After the signal supplied to the decoding circuit has been decoded, this decoded signal is supplied to an HDTV monitor for display.

In the above-described, the high-resolution TV signal supplied via the input terminal is subjected to high-efficient coding at the HDTV encoder, and then is supplied to the HDTV decoder via the transmission line. The HDTV decoder decodes the signal supplied via the transmission line, and then displays the decoded signal on the HDTV monitor.

With this system, when a low-resolution TV signal is transmitted, the low-resolution signal is converted into a high-resolution TV signal and then the converted signal is transmitted on the same transmission line. When the display unit of the receiver can only make a low-resolution display, the high-resolution TV signal transmitted must be decoded by the HDTV decoder, and then the decoded signal must be converted into a low-resolution signal (i.e., down converted).

As described above, with a conventional system for subjecting a high-resolution TV signal to digital high-efficient coding before transmission, only a high-resolution TV signal can be transmitted. Because of this, to make use of existing television software, a low-resolution TV signal must be converted into a high-resolution TV signal on the transmission side. When the display unit of the receiver can only provide a low-resolution display, the received high-resolution TV signal must be decoded the decoded signal converted into a low-resolution signal.

SUMMARY OF THE INVENTION

Accordingly, an object of the present invention is to provide a video-signal transmitting and a video-signal receiving apparatus which eliminates the drawbacks in the prior art and are capable of transmitting and receiving not only high-resolution TV signals but also low-resolution TV signals.

To achieve the foregoing object, the present invention provides a video-signal transmission and reception method in which, when a high-resolution video signal is supplied from an input terminal, the signal is frequency-divided by means of a two-dimensional (horizontal-vertical) filter, then each of the divided signals is subjected to digital high-efficient coding by a coding means, and the coded signals are transmitted through transmission lines, and in which a high-resolution receiver reproduces a high-resolution video signal by decoding and synthesizing the signals obtained from the transmission lines. The invention also provides a video-signal transmitting and receiving apparatus for use in this method.

Further, the invention provides a video-signal reception method of reproducing a low-resolution video signal by selecting and reproducing the signals encoded from the horizontal and vertical low-band signals of the frequency-divided signals from the two-dimensional filter, as well as a video-signal receiving apparatus for use in this method.

Further, the invention provides a video-signal transmission and reception method in which, when a low-resolution video signal is supplied from an input terminal, the signal is subjected to digital high-efficient coding by encoding means and the coded signal is transmitted through one of the transmission lines, and in which a high-resolution receiver reproduces a high-resolution video signal by decoding the signal obtained from the transmission line into a high-resolution signal. The invention also provides a video-signal transmitting and receiving apparatus for use in this method.

Still further, the invention provides a video-signal transmission and reception method in which, when low-resolution video signals are supplied from an input terminal, each video signal is subjected to digital high-efficient coding by encoding means and the individual coded signals are transmitted through the transmission lines, and in which a high-resolution receiver decodes each signal obtained from the transmission lines and displays the decoded low-resolution video signals simultaneously. The invention also provides a video-signal transmitting and receiving apparatus for use in this method.

Still further, the invention provides a video-signal reception method of reproducing a low-resolution video signal by causing a low-resolution receiver to select and decode one of the coded signals, as well as a video-signal receiving apparatus for use in this method.

With the means described above, when the transmission side transmits a high-resolution TV signal, it can frequency-divide the high-resolution TV signal and transmit the divided signals through a plurality of transmission lines. When low-resolution TV signals are transmitted, the individual low-resolution TV signals can be transmitted through the transmission lines. When the reception side is a high-resolution receiver, it is possible to reproduce a high-resolution TV signal or an interpolated low-resolution TV signal, or to simultaneously reproduce low-resolution TV signals. When the reception side is a low-resolution receiver, a high-resolution TV signal, which could not be reproduced easily in the past, can be reproduced easily by selecting and processing the horizontal and vertical low-band signals. In addition, when low-resolution TV signals are encoded and transmitted, it is possible to selectively produce one low-resolution signal.

DETAILED DESCRIPTION OF THE PREFERRED EMBODIMENTS

Hereinafter, an embodiment of the present invention will be explained, referring to the accompanying drawings.

Figure 1:
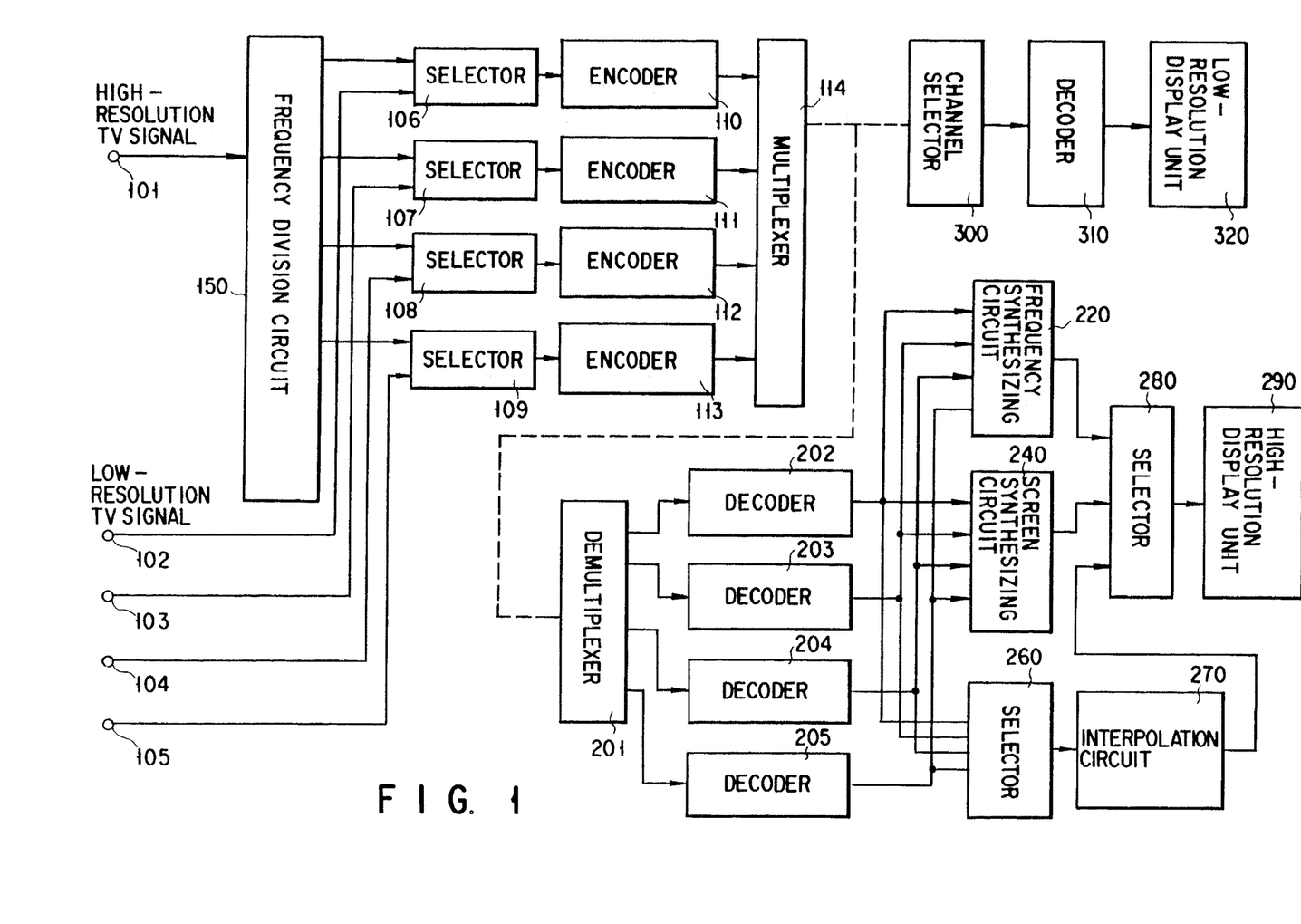
FIG. 1 is a block diagram of an embodiment of the present invention.

FIG. 1 is a block diagram of a video-signal transmitting and receiving system according to the present invention.

The outline of a video-signal transmitting apparatus will be described. In this system, a high-resolution TV signal is based on, e.g., 1920 horizontal pixels and 1080 effective vertical scanning lines, and a low-resolution TV signal is based on, e.g., 720 horizontal pixels and 480 effective vertical scanning lines.

A high-resolution TV signal is supplied to a video-signal input terminal 101. The high-resolution TV signal supplied to the video-signal input terminal 101 is supplied to a frequency division circuit 150, which divides the signal into, e.g., four bands of signals in this embodiment. The individual divided signals are supplied to one input terminal of each of selectors 106 to 109, respectively. The other input terminal of each of selectors 106 to 109 is provided with video-signal input terminals 102 to 105, respectively. Low-resolution TV signals 1 to 4 are supplied to the input terminals 102 to 105, respectively.

The video signal obtained from the frequency division circuit 150 is divided into signals whose frequency band is almost the same as that of the low-resolution TV signal supplied to each of the input terminals 102 to 105, which will be explained in detail later. The video signals selected at the selectors 106 to 109 are supplied to encoding units 110 to 113, respectively. The encoding units then encode the signals and supply the coded signals to a multiplexer 114. The multiplexer 114 subjects the individual signals from the encoding units 110 to 113 to time-division multiplexing and outputs the multiplexed signal.

Next will be explained a high-resolution TV signal receiving apparatus.

The video signal received is first divided for each encoding channel by a demultiplexer 201, and the divided signals are sent to corresponding decoding units 202 to 205. When the signals decoded at the decoding units 202 to 205 are high-resolution signals, the decoded signals are frequency-synthesized by a frequency synthesizing circuit 220 to decode them into the original high-resolution TV signal. This original TV signal passes through a selector 280 and is displayed on a high-resolution display unit 290. When the decoded signals are low-resolution signals, the decoded signals are converted by a screen synthesizing circuit 240 into video signals for a multi-screen. Then, the converted signal passes through the selector 280 and is displayed on a high-resolution display unit 290. When the decoded signals are low-resolution signals, one of the output video signals from the decoding units 202 to 205 is selected by a selector 260. The selected signal is converted into a high-resolution TV signal by an interpolation circuit 270. The high-resolution TV signal passes through the selector 280 and is displayed on the high-resolution display unit 290.

Next will be explained a low-resolution TV signal receiving apparatus.

The received video signal is selected by a channel selector 300. When the received video signal is a high-resolution TV signal, the signals encoded from the horizontal and vertical lower-frequency signals (the signals in frequency band A in FIG. 2B) of the high-resolution TV signal are selected. These selected signals are decoded by a decoding circuit 310, and the decoded signals are displayed on a low-resolution display unit 320. When the video signal received is a low-resolution TV signal, the channel selector 300 selects the signal to be decoded. Then, this selected signal is decoded at the decoding circuit 310, and the decoded signal is displayed on the low-resolution display unit 320.

The video-signal transmitting apparatus will be explained in more detail.

Figures 2A, 2B:
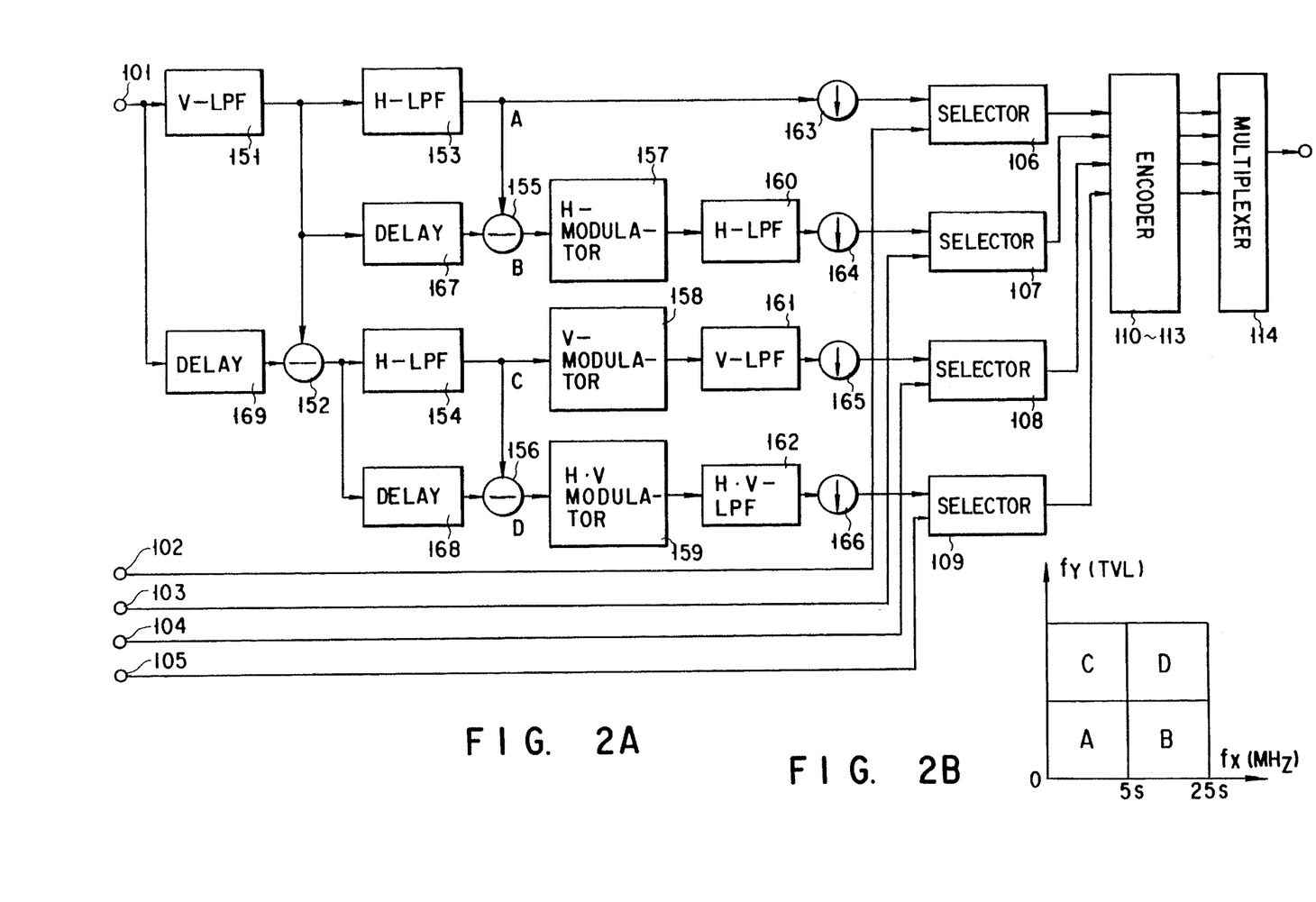
FIG. 2A is a block diagram of a transmitting apparatus associated with the present invention.
FIG. 2B shows an example of frequency band division in a frequency divider.

FIG. 2A is a block diagram of a concrete video-signal transmitting apparatus.

A video signal supplied to the video-signal input terminal 101 is supplied to a vertical low-pass filter (V-LPF) 151 and a delay circuit 169. The delay circuit 169 has the same delay amount as the V-LPF 151. A vertical low-band signal is obtained from the V-LPF 151. A subtraction circuit 152 combines the output signal of V-LPF 151 and the output signal of delay circuit 169 to produce a vertical high-band signal. Namely, the input video signal is separated into a vertical low-band signal and a vertical high-band signal.

The vertical low-band signal from the V-LPF 151 is supplied to a horizontal low-pass filter (H-LPF) 153 and a delay circuit 167. The delay circuit 167 has the same delay amount as the H-LPF 153. A subtraction circuit 155 combines the output signal of H-LPF 153 and the output signal of delay circuit 167 to produce a horizontal high-band signal. A horizontal low-band signal is obtained from the H-LPF 153. The vertical high-band signal from the subtraction circuit 152 is supplied to a horizontal low-pass filter (H-LPF) 154 and a delay circuit 168. The delay circuit 168 has the same delay amount as the V-LPF 154. A subtraction circuit 156 combines the output signal of H-LPF 154 and the output signal of delay circuit 168 to produce a horizontal high-band signal. A horizontal low-band signal is obtained from the H-LPF 154.

Ideally, the frequency bands of the video signal thus separated are arranged as shown by A to D in FIG. 2B, where fy and fx indicate the vertical frequency and the horizontal frequency, respectively. If the signals in A to D have the same frequency band as the above low-resolution TV signal, the signals in frequency band B in FIG. 2B can be converted into horizontal and vertical low-band signals as shown in FIG. 3B by modulating them in accordance with a frequency of fs (cutoff frequency of H-LPF 153 and 154) in FIG. 3A. Similarly, the signals in frequency band C in FIG. 2B can be converted into horizontal and vertical low-band signals as shown in FIG. 3D by modulating them in accordance with a frequency of fL in FIG. 3C (concretely, two-line inverting process of non-interlace signal or line inverting process of interlace signal). Likewise, the signals in frequency band D in FIG. 2B can be converted into horizontal and vertical low-band signals as in frequency bands B and C by modulating them horizontally and vertically as shown in FIGS. 3A and 3C.

Figure 3A:
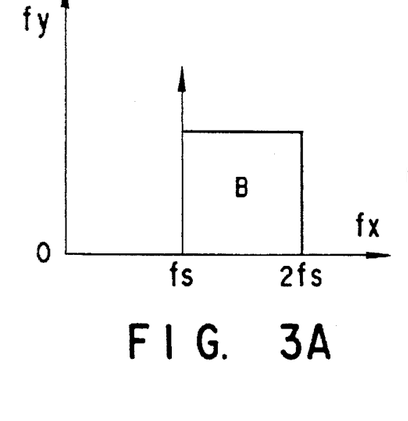
FIGS. 3A to 3D are diagrams explaining a frequency band shifting process in the apparatus illustrated in FIG. 2A.
Figure 3B:
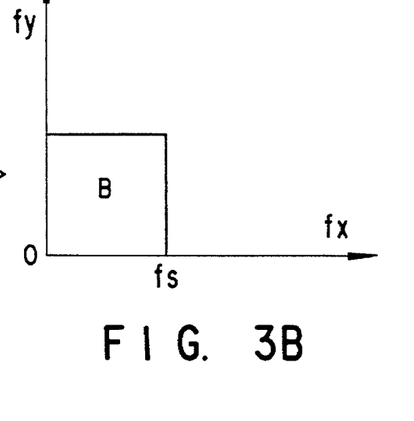
Figure 3C:
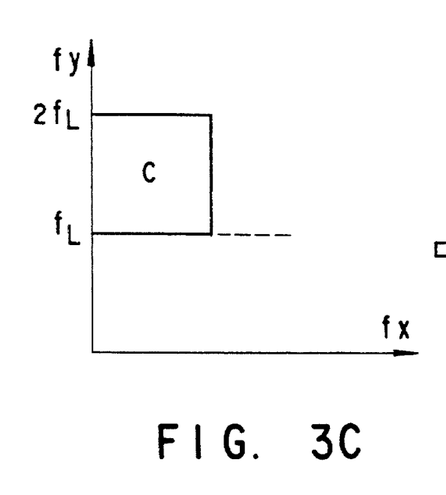
Figure 3D:
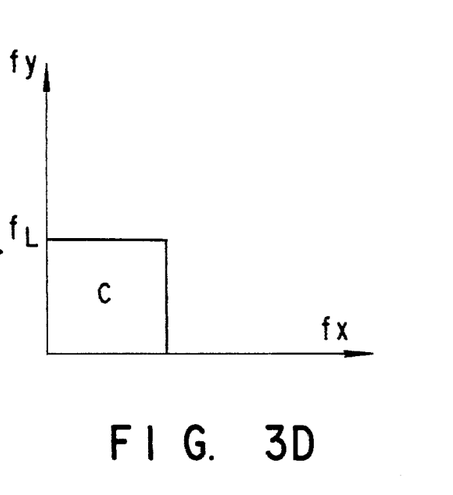

The frequency shifting process shown in FIGS. 3A and 3B is carried out by a horizontal modulating circuit 157. The frequency shifting process shown in FIGS. 3C and 3D is carried out by a vertical modulating circuit 158. Similarly, the frequency shifting process in the horizontal and the vertical direction of frequency band D of FIG. 2B is carried out by a horizontal and vertical modulating circuit 159.

An H-LPF 160, V-LPF 161, and H.V LPF 162 cut off the unnecessary high-band components caused by frequency modulation from the signals in each frequency band processed as described above. Then, these signals undergo a subsampling process and a line thin out at down-sampling circuits 163 to 166.

Here, it is important to prevent the frequency-divided signals in frequency band A of FIG. 2B from being almost equal to those in frequency bands B, C, and D as a result of the modulation from generating horizontal and vertical aliasing signals. Specifically, the down-sampling frequency must be higher than 2 fs, and frequency bands of V-LPF 151, 161 and 162 must be limited to prevent aliasing signals caused by the line thin out.

The signals thus subjected to down sampling are supplied to the selectors 106 to 109. The selectors 106 to 109 are supplied with low-resolution TV signals from the video-signal input terminals 102 to 105, respectively. The selectors 106 to 109 select either high-resolution TV signals or low-resolution TV signals and supply the selected signals to the encoding units 110 to 113.

Figure 4:
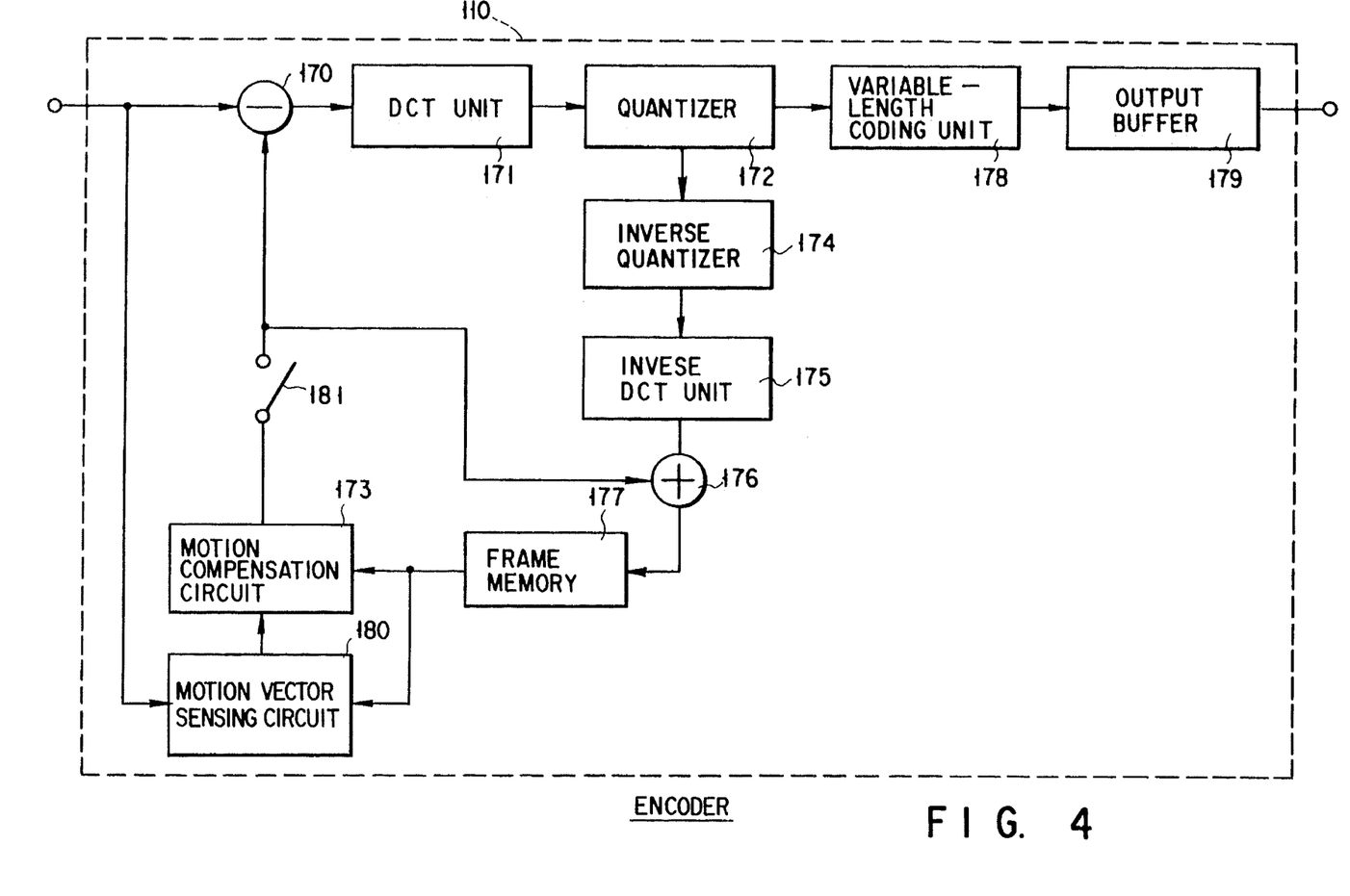
FIG. 4 is a block diagram of an encoding unit illustrated in FIG. 1.

FIG. 4 shows one of the encoding units 110 to 113 as being representative of an encoding circuit of the present invention. The input signal is supplied to a subtracter 170, which performs a subtracting process on a combination of the high-resolution TV signals or low-resolution TV signals and a one-frame delayed signal subjected to a motion compensation. The signal from the subtracter 170 is used as an interframe difference signal (prediction signal), which undergoes a DCT process at a DCT unit 171. This processed signal is quantized at a quantizer 172. The quantized signal is divided into a 0 run signal and a level signal, which are supplied to a variable length coding circuit 178. The variable length coding circuit 178 subjects the supplied signal to Huffman coding. The coded video signal is supplied to an output buffer 179, which outputs a signal at a constant rate. On the other hand, the quantized DCT coefficient from the quantizer 172 is supplied to an inverse quantizer 174, which subjects the coefficient to an inverse quantizing process to restore almost the original DCT coefficient. Then, this coefficient is subjected to an inverse DCT process at an inverse DCT unit 175 to decode it to almost the original interframe difference signal. The decoded signal is added to a one-frame delayed signal at an add circuit 176 to restore almost the original input signal. This input signal undergoes a one-frame delaying process at a frame memory 177. The signal from the frame memory 177 is supplied to a motion compensation circuit 173 and a motion vector sensing circuit 180. The motion compensation circuit 173 performs a motion compensation of the output signal of frame memory 177 on the basis of the picture motion vector sensed at the motion vector sensing circuit 180. This compensated signal is supplied to the subtract circuit 170 and the add circuit 176 to produce an interframe difference signal. When the interframe difference signal is large, intraframe coding is effected by a switch 181 is off.

Normally, the encoding units 110 to 113 have the same construction, and motion vector sensing and motion compensation are effected independently at each encoding unit. When the signal supplied to be encoded is a signal obtained from frequency-band division of a high-resolution TV signal, however, the motion vector sensed by the motion vector sensing circuit 180 of the encoding unit 110 to which the signals in frequency band A of FIG. 2B (the horizontal and vertical low-band signals from the beginning) are supplied, can be applied to the other encoding units 111 to 113. As a result, only the encoding unit 110 for encoding a motion vector is sufficient.

The signals thus encoded are combined at the multiplexer 114 shown in FIGS. 1 and 2A. At this time, they are normally multiplexed according to the amount of codes obtained from the individual encoding units 110 to 111. When a signal to be encoded is a signal obtained of frequency-band division of a high-resolution TV signal, the signals in frequency band A of FIG. 2 may be given top priority in transmission, taking into account a contribution to the human visual characteristics. Then, priority may be given to bands B, C, and D, or C, B, and D in that order, and the signals in these bands be multiplexed in time division.

As a concrete example, example of the present invention, a video-signal decoding apparatus for a high-resolution TV signal will be described with reference to FIG. 5.

Figure 5:
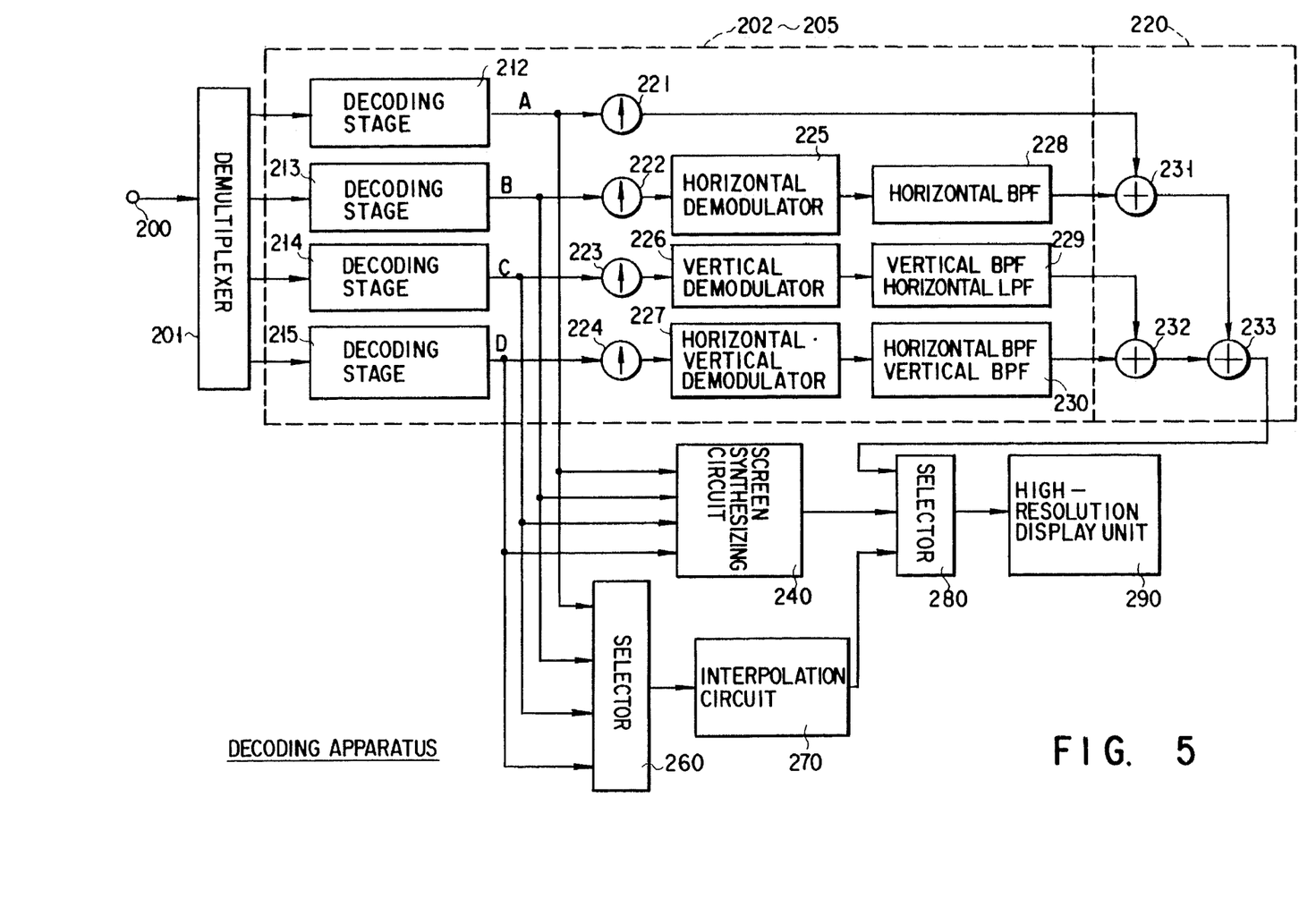
FIG. 5 is a block diagram of a decoding apparatus associated with the present invention.

In FIG. 5, the encoded video signal is applied to a video-signal input terminal 200. A video-signal separator (demultiplexer) 201 separates each multiplexed coded signal. The individual separated coded signals are supplied to decoding stages 212 to 215, respectively. Here, when the input signals are high-resolution TV signals, the decoding stage 212 decodes the signals in frequency band A of FIG. 2B, the decoding stage 213 decodes the signals in band B, the decoding stage 214 decodes the signals in band C, and the decoding stage 215 decodes the signals in band D.

Figure 6:
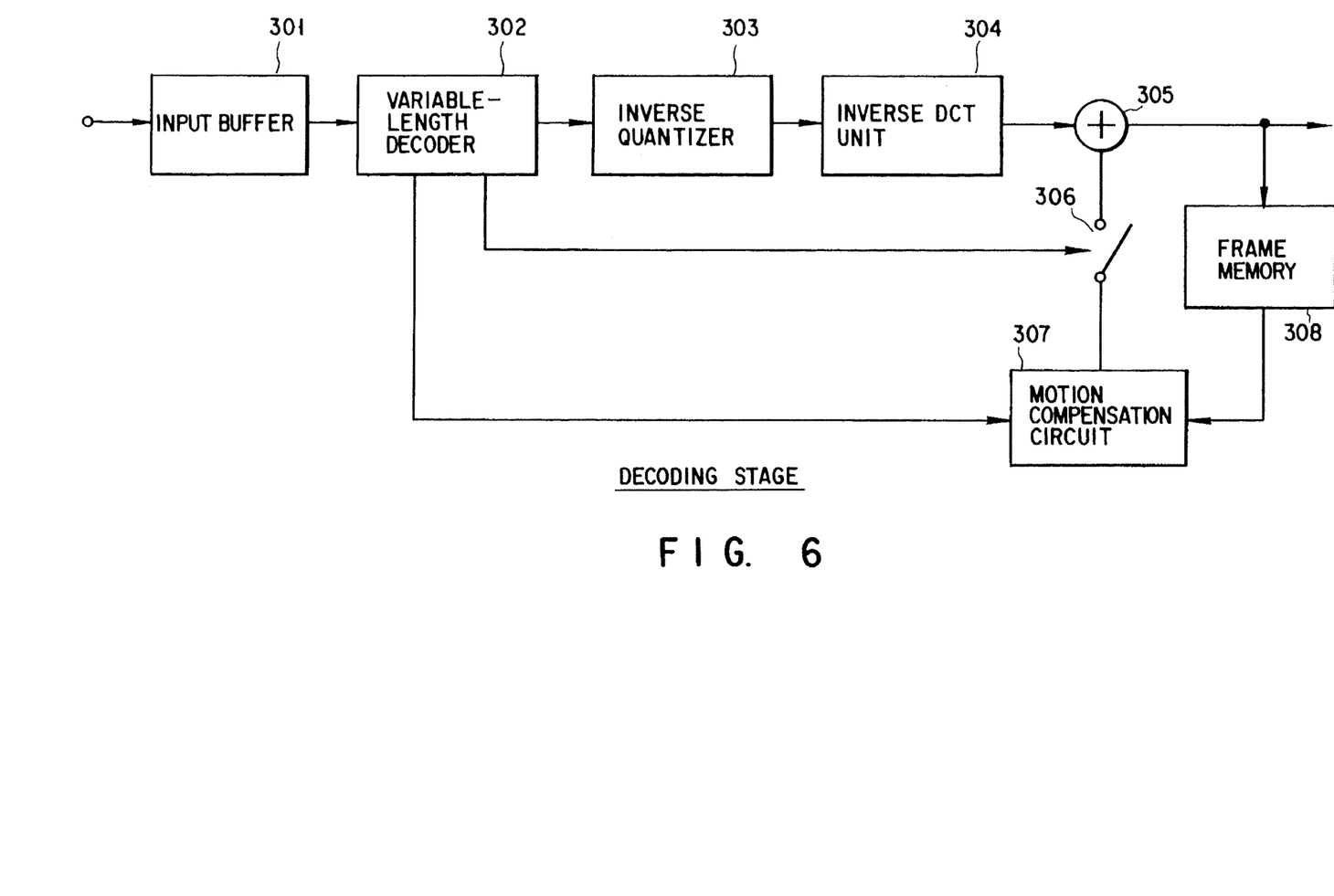
FIG. 6 is a block diagram of the decoding unit illustrated in FIG. 1.

FIG. 6 shows an example of the construction of one of the decoding stages 212 to 215 as being representative of a decoding stage of the present invention. The coded signal input is supplied via an input buffer 301 to a variable length decoder 302, which decodes the input signal. The decoded signal is subjected to inverse quantization by an inverse quantization circuit 303. The resulting signal is supplied to an inverse DCT unit 304, which subjects it to an inverse DCT process. The processed signal is supplied to an adder circuit 305. The other input to the adder circuit 305 is a signal obtained by delaying the output of the adder circuit 305 for one frame by a frame memory 308 and for making motion compensating the delayed video signal by a motion compensation circuit 307. However, when the coded signal subjected to an interframe signal process is decoded, the one-frame delayed signal is supplied to the adder circuit 305. When the coded signal subjected to an intraframe signal process is decoded, the one-frame delayed signal is cut off by a switch 306 and is not supplied to the adder circuit 305.

Figure 7A:
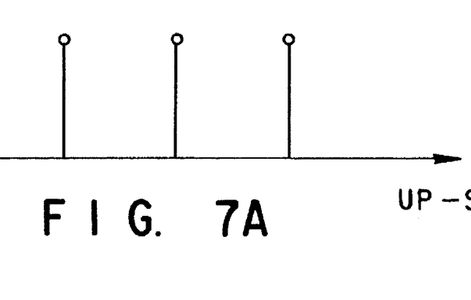
FIGS. 7A to 7D are diagrams explaining the operation illustrated the apparatus of FIG. 6.
Figure 7B:
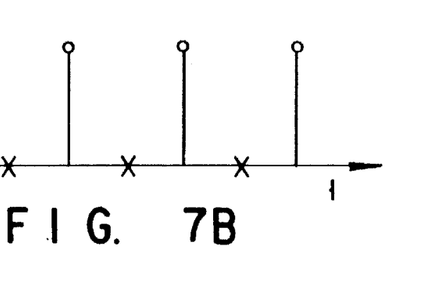
Figure 7C:
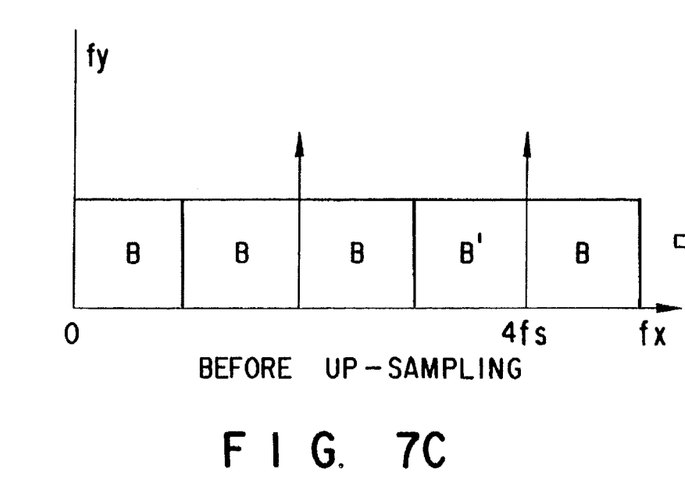
Figure 7D:
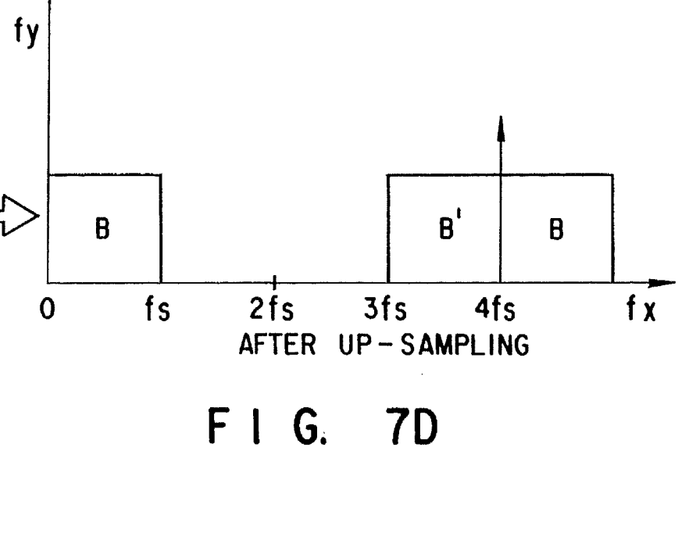
Figures 8A, 8B, 8C, 8D:
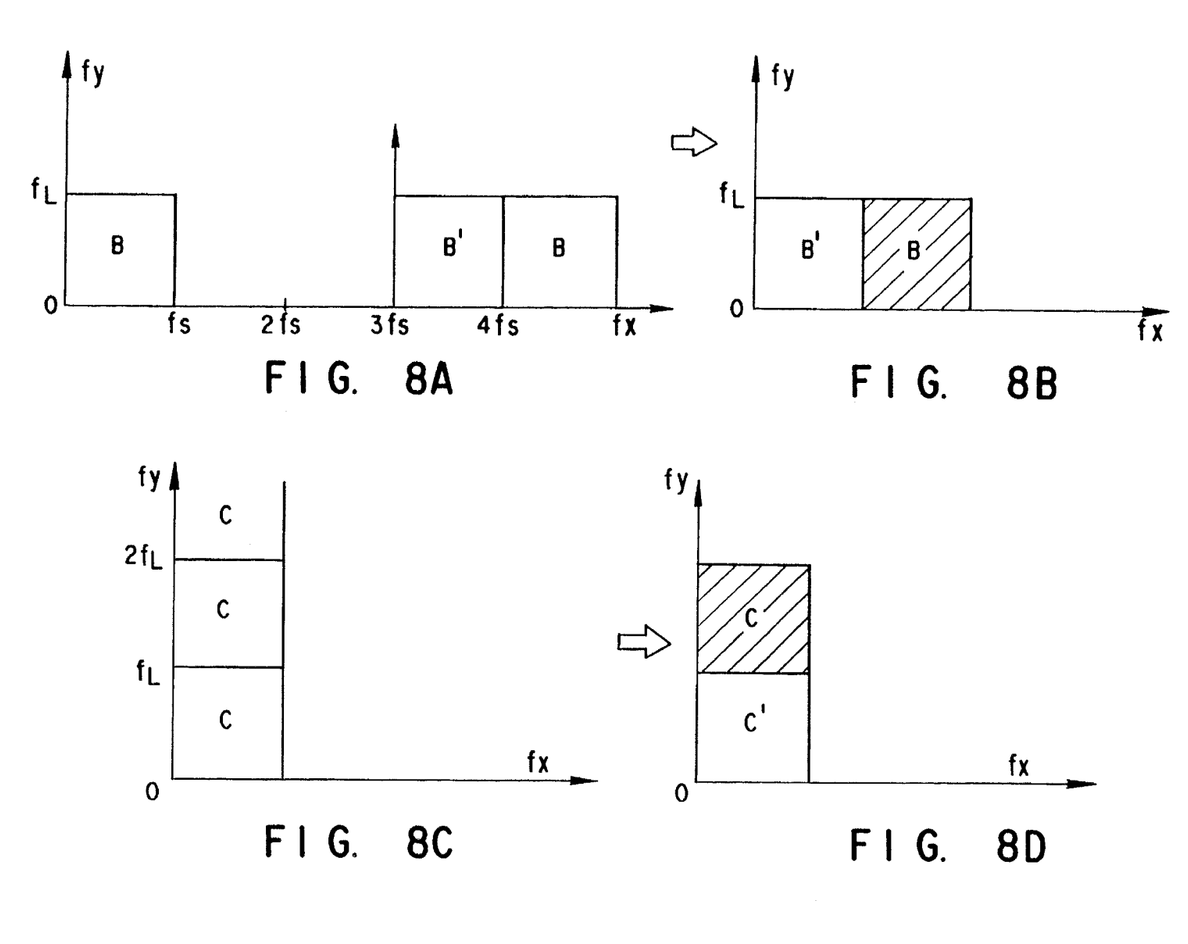
FIGS. 8A to 8D are diagrams explaining a frequency band shifting process in the apparatus illustrated in FIG. 6.

In FIG. 5, the video signal thus decoded undergoes up-sampling at up-sampling circuits 221 to 224. Up-sampling is effected by inserting 0s in the signal of FIG. 7A as shown in FIG. 7B. FIGS. 7A and 7B show a manner of up-sampling the signal in the horizontal direction. Similarly, in the vertical direction, zero's lines insertion is performed. FIG. 7C shows a frequency band before up-sampling, and FIG. 7D shows a frequency band after up-sampling. The signal thus subjected to up-sampling is supplied to a horizontal demodulating circuit 225. The horizontal demodulating circuit 225 modulates the signals in the desired frequency, band B in accordance with 3 fs as shown in FIG. 8A so that the band signals may be in the range from fs to 2 fs. A horizontal band-pass filter (BPF) 228 removes the frequency band shaded in FIG. 8B from the modulated signal to convert it into the signal before the coding. Similarly, the signal from the decoding stage 214 is subjected to the up-sampling process. A vertical demodulating circuit 226 demodulates this processed signal by an every-two-line inverting process or a line inverting process to convert the signal of FIG. 8C into the signal of FIG. 8D. The every-two-line inverting process is used for a progressive TV signal, the line inverting process is used for an interlace TV signal. Further, a vertical BPF.horizontal LPF 229 band-limits the components shaded in FIG. 8D of the decoded signal. Similarly, the signal from the decoding stage 215 undergoes the up-sampling process at the up-sampling circuit 224, a horizontal and vertical decoding process at the horizontal and vertical decoding circuit 227, and a horizontal and vertical filtering process at the horizontal BPF.vertical BPF 230 in that order. After these processes, the resulting signal is reproduced as the horizontal and vertical high-band signal in frequency band D of FIG. 2B before the coding. After the delays occurring in the filters etc. of the video signals in bands A, B, C, and D of FIG. 2B thus reproduced are equalized by delay units (not shown), these signals are added to each other by adder circuits 231, 232, 233. The added signal is supplied as a high-resolution TV signal to a selector 280.

Since the signal processing when more than one low-resolution TV signal is received is the same as in FIG. 1, explanation will be omitted.

With the present invention, when the input TV signal is a high-resolution TV signal, more than one encoding unit can be used as when more than one low-resolution TV signal is supplied, by dividing the frequency band and performing a horizontal and/or a vertical modulation. It is possible to decode the frequency band of part of the high-resolution signal easily, even if the receiver side is a low-resolution receiver, which could not be used for this purpose in the prior art. Further, with a high-resolution receiver, it is possible to reproduce a high-resolution TV signal, provide a multi-display of low-resolution TV signals, and display a screen of a low-resolution TV signal up-converted.

In the above embodiment, when a high-resolution TV signal is frequency-divided as shown in FIG. 2B, frequency bands A, B, C, and D do not necessarily have to have the same bandwidth.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A video-signal transmitting apparatus comprising:

an input terminal receiving a high-resolution TV signal;

input terminals receiving a plurality of low-resolution TV signals;

frequency-dividing means for frequency-dividing said high-resolution TV signal into signals in a plurality of frequency bands;

frequency shifting means for obtaining lower-frequency signals by frequency-shifting high-band signals of said frequency-divided high-resolution TV signal to a specified band;

down-sampling means for down-sampling said lower-frequency signals and low-band signals of said frequency-divided high-resolution TV signal;

selecting means for selecting a group of said down-sampled signals when said high-resolution TV signal is received by said input terminal and a group of said plurality of low-resolution TV signals when said low-resolution TV signals are received by said input terminals;

coding means for obtaining a plurality of coded signals by coding each of said selected signals; and transmitting means for transmitting said plurality of coded signals to a transmission line.

2. A video-signal transmitting apparatus according to claim 1, wherein said coding means, when coding each of said frequency-divided high-resolution TV signals, also uses a motion vector signal obtained from one of said low-band signals of said frequency-divided high-resolution TV signals in coding the signals in other frequency-divided bands; and said transmitting means transmitting said motion vector signal as an only motion vector signal.

3. A video-signal transmitting apparatus according to claim 1, wherein said transmitting means time-division multiplexes a plurality of coded signals obtained from said coding means.

4. A video-signal transmitting apparatus according to claim 1, wherein said frequency division means divides said high-resolution TV signal into a first signal of a horizontal and a vertical low band, a second signal of a horizontal high band and a vertical low band, a third signal of a horizontal low band and a vertical high band, and a fourth signal of a horizontal and a vertical high band.

5. A video-signal transmitting apparatus according to claim 4, wherein frequency band of said first signal is the same as that of said low-resolution TV signal.

6. A video-signal transmitting apparatus according to claim 5, wherein said frequency shifting means frequency-shifts said second, third, and fourth signals to the same frequency band as that of said first signal.

7. A video-signal transmitting apparatus comprising:

an input terminal receiving a high-resolution TV signal;

input terminals receiving a plurality of low-resolution signal are supplied;

frequency-dividing means for frequency-dividing said high-resolution TV signal into signals in a plurality of frequency bands;

frequency shifting means for obtaining lower-frequency signals by frequency-shifting high-band signals of said frequency-divided signals to a specified band;

down-sampling means for down-sampling, in horizontal and vertical directions, said lower-frequency signals and low-band signals of said frequency-divided high resolution TV signals;

selecting means for selecting a group of said down-sampled signals when said high-resolution TV signal is received by said input terminal and a group of said plurality of low-resolution TV signals when said low-resolution TV signals are received by said input terminals;

coding means for obtaining a plurality of coded signals by coding each of said selected signals; and transmitting means for transmitting said plurality of coded signal to a transmission line.

8. A video-signal receiving apparatus, wherein a first multiplex coded signal is obtained by dividing a high-resolution TV signal into signals in a plurality of frequency bands, frequency-shifting each signal in other frequency bands to a particular one of said plurality of frequency bands, down-sampling individual TV signals in said particular frequency band, subjecting said down-sampled signals to high-efficient coding to produce a plurality of first coded signals, and time-division multiplexing said plurality of first coded signals, and a second multiplex coded signal is obtained by subjecting a plurality of low-resolution TV signals to high-efficient coding to produce a plurality of second coded signals, and time-division multiplexing said plurality of second coded signals, said apparatus comprising:

receiving means for receiving said first and second multiplex coded signals;

separating means for separating said first multiplex coded signal in time division to produce a plurality of first coded signals;

decoding means for decoding said plurality of first coded signals to produce a plurality of video signals;

up-sampling means for up-sampling said plurality of video signals to produce a plurality of up-sampled video signals;

frequency shifting means for frequency-shifting said frequency-shifted up-sampled video signals of said plurality of up-sampled video signals to said plurality of frequency bands; and synthesizing means for synthesizing said frequency-shifted video signals and up-sampled video signal not frequency-shifted.

9. A video-signal receiving apparatus according to claim 8, further comprising:

arranging means for arranging a plurality of video signals obtained from said decoding means when said receiving means has received said second multiplex coded signal;

interpolating means for selecting and interpolating one of a plurality of video signals obtained from said decoding means; and selecting means for selecting an output video signal of one of said synthesizing means and said interpolating means and supplying the selected signal to a high-resolution display unit.

10. A video signal receiving apparatus according to claim 8, wherein said particular frequency band is the same as the frequency band of said low-resolution TV signal.

11. A video signal receiving apparatus according to claim 8, wherein said up-sampling means divides said high-resolution TV signal into a first signal of a horizontal and a vertical low band, a second signal of a horizontal high band and a vertical low band, a third signal of a horizontal low band and a vertical high band, and a fourth signal of a horizontal and a vertical high band, and said particular frequency band is said horizontal and vertical low band.

12. A video-signal receiving apparatus according to claim 11, wherein said frequency shifting means is a processing system for said second, third, and fourth signals.

13. A method of transmitting and receiving a video signal, wherein a first multiplex coded signal is obtained by dividing a high-resolution TV signal into signals in a plurality of frequency bands, frequency-shifting each signal in other frequency bands to a particular one of said plurality of frequency bands, down-sampling individual TV signals in said particular frequency band, subjecting the down-sampled signals to high-efficient coding to produce a plurality of first coded signals, and finally time-division multiplexing said plurality of first coded signals, and a second multiplex coded signal is obtained by subjecting a plurality of low-resolution TV signals to high-efficient coding to produce a plurality of second coded signals, and time-division multiplexing said plurality of second coded signals, said method comprising:

a first step of transmitting one of said first multiplex coded signal and said second multiplex coded signal;

a second step of receiving one of said first multiplex coded signal and said second multiplex coded signal;

a third step of, when said first multiplex coded signal is received, separating said first multiplex coded signal in time division to produce a plurality of coded signals;

a fourth step of decoding said plurality of coded signals to produce a plurality of video signals;

a fifth step of up-sampling said plurality of video signals to produce a plurality of up-sampled video signals;

a sixth step of frequency-shifting said frequency-shifted up-sampled video signals of said plurality of up-sampled video signals to said plurality of frequency bands;

a seventh step of synthesizing said frequency-shifted video signals and up-sampled video signals not frequency-shifted;

an eighth step of, when said second multiplex coded signal is received, arranging said plurality of video signals obtained at said fourth step on a screen;

a ninth step of selecting and interpolating one video signal from said plurality of video signals obtained at said fourth step; and a tenth step of selecting one of said output video signal obtained at said eight step and that obtained at said ninth step and supplying the selected signal to a high-resolution display unit.

* * * * *